(12) United States Patent
Kim

(10) Patent No.: US 9,556,950 B2
(45) Date of Patent: Jan. 31, 2017

(54) SLIDING OPERATION TYPE ELECTRONIC AUTO SHIFT LEVER

(71) Applicant: Hyundai Motor Company, Seoul (KR)

(72) Inventor: Eun-Sik Kim, Kwangmyong-Shi (KR)

(73) Assignee: Hyundai Motor Company, Seoul (KR)

( * ) Notice: Subject to any disclaimer, the term of this patent is extended or adjusted under 35 U.S.C. 154(b) by 90 days.

(21) Appl. No.: 14/536,508

(22) Filed: Nov. 7, 2014

(65) Prior Publication Data

US 2015/0167829 A1 Jun. 18, 2015

(30) Foreign Application Priority Data

Dec. 18, 2013 (KR) .......................... 10-2013-158559

(51) Int. Cl.
*F16H 59/08* (2006.01)

(52) U.S. Cl.
CPC ......... *F16H 59/08* (2013.01); *F16H 2059/081* (2013.01); *Y10T 74/2003* (2015.01)

(58) Field of Classification Search
CPC . F16H 59/08; F16H 2059/081; Y10T 74/2003
See application file for complete search history.

(56) References Cited

U.S. PATENT DOCUMENTS

| | | | | |
|---|---|---|---|---|
| 7,176,892 B2 * | 2/2007 | Kobayashi | ............ | G05G 9/047 345/161 |
| 8,686,717 B2 * | 4/2014 | Wang | .................... | G01B 7/003 324/207.11 |
| 2002/0189381 A1 * | 12/2002 | Kliemannel | ........ | F16H 59/0204 74/335 |
| 2005/0039562 A1 * | 2/2005 | Kako | .................. | F16H 59/0278 74/473.33 |
| 2006/0283276 A1 * | 12/2006 | Komatsu | ............... | F16H 59/105 74/335 |
| 2008/0115613 A1 * | 5/2008 | Giefer | .................... | B60K 37/06 74/473.21 |
| 2008/0278148 A1 * | 11/2008 | Fouts | .................... | F16H 59/044 324/207.2 |
| 2009/0000413 A1 * | 1/2009 | Furhoff | .................. | B60K 37/06 74/473.3 |
| 2010/0237731 A1 * | 9/2010 | Gravio | .................. | F16H 49/005 310/103 |
| 2010/0294067 A1 * | 11/2010 | Bak | ..................... | F16H 59/0204 74/473.12 |
| 2012/0234124 A1 * | 9/2012 | Nozaki | ................... | F16H 61/32 74/473.12 |

(Continued)

FOREIGN PATENT DOCUMENTS

| | | |
|---|---|---|
| JP | 2004-139578 A | 5/2004 |
| JP | 2011-173458 A | 9/2011 |

*Primary Examiner* — David M Fenstermacher

(74) *Attorney, Agent, or Firm* — Morgan, Lewis & Bockius LLP

(57) ABSTRACT

A sliding operation type electronic auto shift lever may include a console part disposed on a console of a vehicle, provided with a quadrangular recess, and provided with a slot portion dented inside the quadrangular recess, and a lever part slidably coupled to an upper portion of the quadrangular recess, wherein the lever part includes a magnetic lever pin part, which protrudes downwardly and includes a magnet, on a lower surface thereof, and the magnetic lever pin part is inserted into the slot portion.

9 Claims, 7 Drawing Sheets

(56) References Cited

U.S. PATENT DOCUMENTS

| | | | | |
|---|---|---|---|---|
| 2013/0031999 | A1* | 2/2013 | Farges | F16H 59/044 |
| | | | | 74/473.12 |
| 2013/0125692 | A1* | 5/2013 | Sasaki | F16H 59/02 |
| | | | | 74/473.36 |
| 2014/0020495 | A1* | 1/2014 | Iwata | G01B 7/14 |
| | | | | 74/473.12 |
| 2014/0020496 | A1* | 1/2014 | Heo | F16H 59/044 |
| | | | | 74/473.12 |
| 2014/0130630 | A1* | 5/2014 | Kim | F16H 59/105 |
| | | | | 74/473.12 |
| 2014/0345408 | A1* | 11/2014 | Pfeifer | G01D 5/145 |
| | | | | 74/473.1 |
| 2015/0135877 | A1* | 5/2015 | Kim | F16H 59/0278 |
| | | | | 74/473.12 |
| 2015/0167829 | A1* | 6/2015 | Kim | F16H 59/08 |
| | | | | 74/473.12 |
| 2015/0268691 | A1* | 9/2015 | Schaub | G05G 5/03 |
| | | | | 74/471 XY |
| 2016/0131246 | A1* | 5/2016 | Park | F16H 59/10 |
| | | | | 74/473.12 |

* cited by examiner

SLIDING OPERATION TYPE ELECTRONIC AUTO SHIFT LEVER

CROSS-REFERENCE TO RELATED APPLICATIONS

The present application claims priority to Korean Patent Application No. 10-2013-158559, filed Dec. 18, 2013, the entire contents of which is incorporated herein for all purposes by this reference.

BACKGROUND OF THE INVENTION

Field of the Invention

The present invention relates to an electronic auto shift lever, and more particularly, to a sliding operation type electronic auto shift lever in an auto transmission vehicle, which includes a sliding operation part with which a gear shift operation part of the auto shift lever is operable by a finger of a user, and in which a gear shift operation is performed based on an input through a sliding operation of the sliding operation part, and the sliding operation part is configured by a console part having a quadrangular recess and a triangular lever part, so that a gear shift operation may be performed according to a position of the lever part which slides on the console part.

Description of Related Art

In general, in order to control a gear shift stage of a vehicle, examples of a shift lever provided in the vehicle include a mechanical shift lever and an electronic shift lever, and usage of the electronic shift lever has been recently increased.

Among the mechanical shift lever and the electronic shift lever, the electronic shift lever is generally disposed in a console inside a driver's seat of the vehicle, but the lever protrudes from an upper portion of the console, so that a user easily operates the shift lever. The aforementioned configuration provides the similar operation to that of the mechanical shift lever in the related art, thereby enabling a user to easily control the gear shift stage.

FIG. 1 illustrates an example of an electronic shift lever in the related art, and FIG. 2 is a schematic diagram illustrating a lever operation method according to an operation of the electronic shift lever in the related art.

As illustrated in FIGS. 1 and 2, in the electronic shift lever in the related art, a shift pattern formed in a relatively simple straight form is configured compared to a gate-formed shift pattern of a mechanical shift lever in the related art. The aforementioned electronic shift lever in the related art additionally includes a button part controlling the P-stage, so that the shift pattern can be more simplified than the shift pattern of the mechanical shift lever in the related art.

However, the electronic shift lever including the aforementioned configuration in the related art has a problem below.

A position of the shift lever is fixed to a console, so that it is difficult to operate the shift lever at a desired position.

Since the shift pattern of the shift lever is fixed in a predetermined form, in general, a straight operation form, it is impossible to respond to various demands of users desiring to perform an operation familiar to the mechanical shift pattern in the related art.

The shift pattern is similar to the shift pattern of the mechanical shift lever in the related art (a method of forwardly and backwardly operating the lever), so that it is difficult to recognize an advantage in introducing the electronic shift lever.

Since the electronic shift lever occupies a large space, that is, the shift lever needs to be moved by the shift pattern, a predetermined space capable of accommodating the shift pattern needs to be allocated, so that there is a disadvantage in that a space inside the vehicle, for example, a space for accommodating a cup holder and the like, is small, and a space for assigning a necessary button function is insufficient.

Since the lever part of the electronic shift lever in the related art is identically configured to the lever part of the mechanical shift lever in the related art, as illustrated in FIG. 2, a stroke is large during the gear shift operation, so that a movement of an entire arm is necessary, thereby causing inconvenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sliding operation type electronic auto shift lever in an auto transmission vehicle, which includes a sliding operation part with which a gear shift operation part of the auto shift lever is operable by a finger of a user, and in which a gear shift operation is performed based on an input through a sliding operation of the sliding operation part, and the sliding operation part is configured by a console part having a quadrangular recess and a triangular lever part, so that a gear shift operation may be performed according to a position of the lever part which slides on the console part.

In an aspect of the present invention, a sliding operation type electronic auto shift lever, may include a console part disposed on a console of a vehicle, provided with a quadrangular recess, and provided with a slot portion dented inside the quadrangular recess, and a lever part slidably coupled to an upper portion of the quadrangular recess, wherein the lever part may include a magnetic lever pin part, which protrudes downwardly and may include a magnet, on a lower surface thereof, and the magnetic lever pin part is inserted into the slot portion.

The slot portion may include at least four sides and the at least four sides are curved inwards.

Each vertex of the quadrangular recess and each vertex of the slot portion are offset in an angular direction with respect to a central axis of the slot portion.

Corners of the quadrangular recess and corners of the lever part are formed of curved surfaces.

The sliding operation type electronic auto shift lever may further include position fixing parts having one or more first position fixing parts and one or more second position fixing parts, wherein the one or more first position fixing parts are mounted in corners of the quadrangular recess, wherein the one or more second position fixing parts are mounted in corners of the lever part, and wherein either of the first position fixing part or the second position fixing part may include a magnet, and either of the first position fixing part or the second position fixing part may include a ferromagnetic material.

The sliding operation type electronic auto shift lever may further include position fixing parts including one or more first position fixing parts and one or more second position fixing parts, wherein the one or more first position fixing parts are mounted in corners of the quadrangular recess, wherein the one or more second position fixing parts are mounted in corners of the lever part, and wherein the first position fixing part and the second position fixing part may include magnets having different magnetic polarities, respectively.

The sliding operation type electronic auto shift lever may further include a gear shift stage recognition unit disposed under the magnetic lever pin part, and including one or more magnetic sensors, wherein the gear shift stage recognition unit detects magnetic force of the magnetic lever pin part to recognize a position of the magnetic lever pin part.

The gear shift stage recognition unit is connected with a gear shift stage controller of the vehicle to transmit recognized position information about the magnetic lever pin part, and the gear shift stage controller receives the position information about the magnetic lever pin part from the gear shift stage recognition unit, and controls gear shift of an electronic auto transmission of the vehicle to be a predetermined gear shift stage in response to the position of the magnetic lever pin part.

The gear shift stage controller presets gear shift stage information including a P-stage, an R-stage, an N-stage, and a D-stage, which are gear shift stages of the vehicle, and a gear shift stage recognition area corresponding to the position of the magnetic lever pin part, and generates gear shift information, which is matched with the position information of the magnetic lever pin part received from the gear shift stage recognition unit, to perform gear shift of the electronic auto transmission of the vehicle.

The lever part is formed in a triangular shape, and the lever part rotates and moves based on a contact point of a predetermined corner of the lever part and a predetermined corner inside the quadrangular recess as an axis when moving within the quadrangular recess.

The present invention including the aforementioned configuration provides advantages discussed below.

The present invention is configured so that a structure of an auto shift lever included in a vehicle is simplified, and the same function as the function of the auto shift lever in the related art is performed, thereby considerably reducing manufacturing cost by a simple structure.

The lever part of the auto shift lever is formed in a slidable triangular plate shape, and a gear shift stage is operable by sliding the lever part by a finger of a driver, thereby achieving a very convenient gear shift operation and operation improvement. Accordingly, the driver operating the auto shift lever of the present invention may clearly recognize a gear shift stage, and feel interest in driving by an interesting operation structure.

The operation lever part of the auto shift lever is configured in a plate shape, so that the operation lever part does not protrude from an upper portion of the console of the auto shift lever, thereby preventing a secondary accident by the auto shift lever when a vehicle collides.

In the lever part of the auto shift lever of the present invention driven in the sliding method, a position of a gear shift stage is disposed so that an advance/reverse intention by a driver is matched to a lever operation direction, thereby preventing an erroneous operation while travelling, and providing convenience during an operation.

Finally, the present invention may be configured by the simple structure as described above, and manufactured by minimizing a package layout by the plate-shaped lever part, thereby considerably improving a layout of the console inside the vehicle, and a design and aesthetic appearance.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to an electronic auto shift lever, and more particularly, to a sliding operation type electronic auto shift lever in an auto transmission vehicle, which includes a sliding operation part with which a gear shift operation part of the auto shift lever is operable by a finger of a user, and in which a gear shift operation is performed based on an input through a sliding operation of the sliding operation part, and the sliding operation part is configured by a console part having a quadrangular recess and a triangular lever part, so that a gear shift operation may be performed according to a position of the lever part which slides on the console part.

Figure 1:
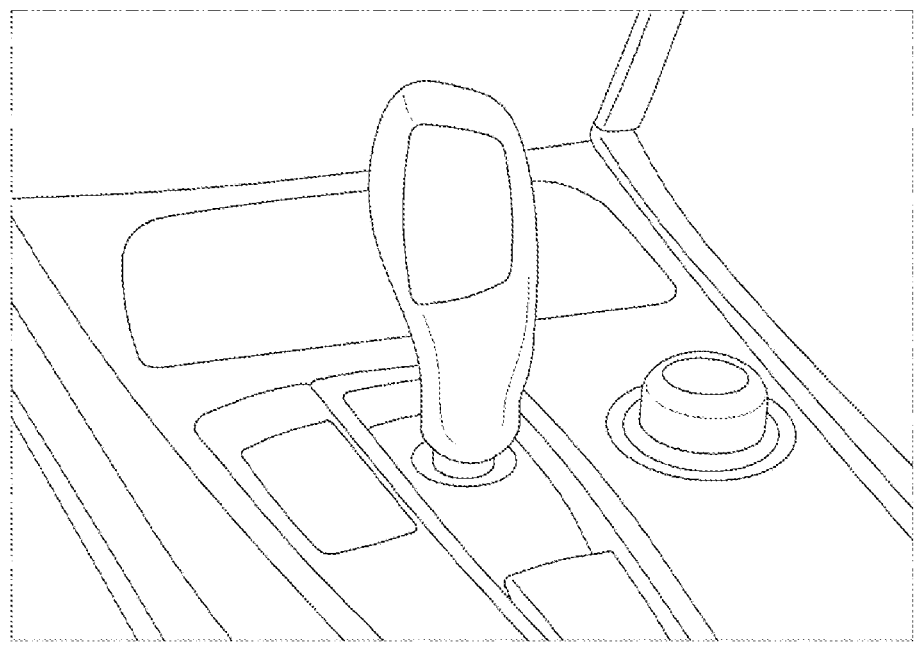
FIG. 1 illustrates an example of an electronic shift lever in the related art.
Figure 2:
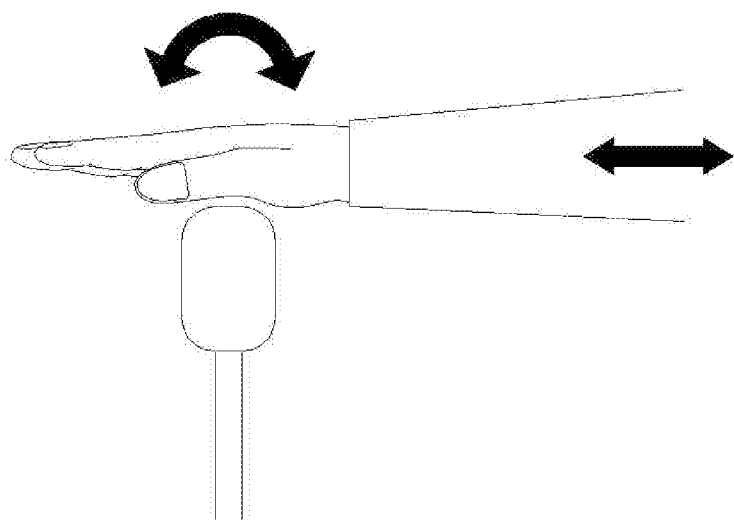
FIG. 2 is a schematic diagram illustrating a lever operation method according to an operation of the electronic shift lever in the related art.
Figure 3:
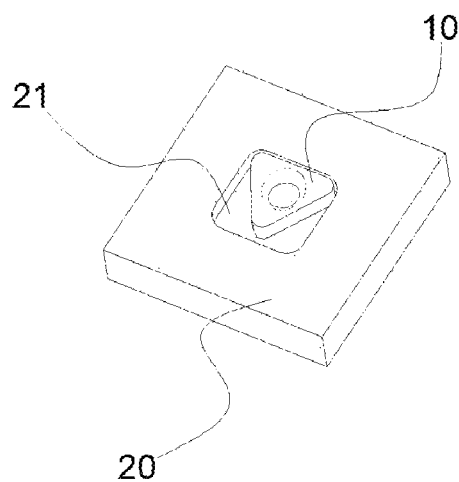
FIG. 3 is a perspective view illustrating an exemplary sliding operation type electronic auto shift lever according to the present invention.
Figure 4:
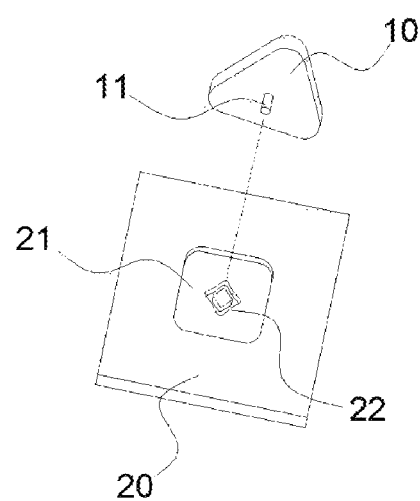
FIG. 4 is an exploded perspective view illustrating a state where a lever part and a console part of the exemplary sliding operation type electronic auto shift lever are separated from each other according to the present invention.
Figure 5:
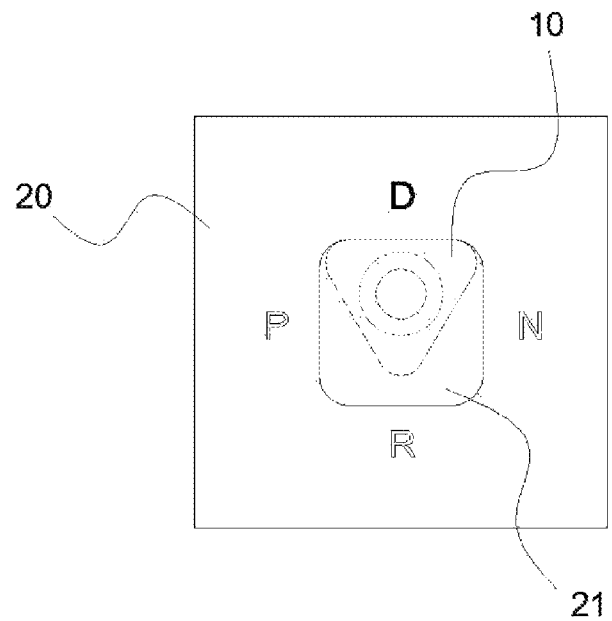
FIG. 5 is a top plan view illustrating an upper portion of the exemplary sliding operation type electronic auto shift lever according to the present invention.
Figure 6:
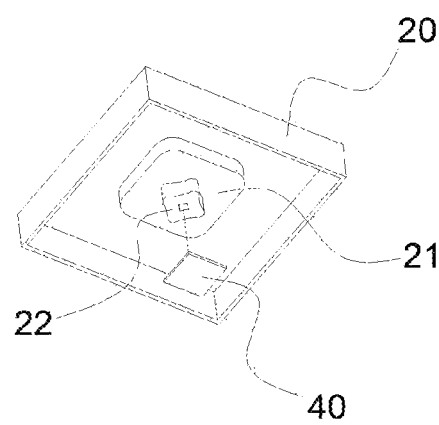
FIG. 6 is a perspective view illustrating a lower portion of the exemplary sliding operation type electronic auto shift lever according to the present invention.

FIG. 3 is a perspective view illustrating a sliding operation type electronic auto shift lever according to an exemplary embodiment of the present invention, FIG. 4 is an exploded perspective view illustrating a state where a lever part 10 and a console part 20 of the sliding operation type electronic auto shift lever according to the exemplary embodiment of the present invention are separated from each other, FIG. 5 is a top plan view illustrating an upper portion of the sliding operation type electronic auto shift lever according to the exemplary embodiment of the present invention, and FIG. 6 is a perspective view illustrating a lower portion of the sliding operation type electronic auto shift lever according to the exemplary embodiment of the present invention.

As illustrated in the drawings, a sliding operation type electronic auto shift lever of the present invention includes the lever part 10, the console part 20, and a gear shift stage recognition unit.

The lever part 10 is a constituent element enabling a user to perform a sliding operation, and as illustrated in the drawings, may have a shape of a triangular prism, each corner of which is formed in a curved surface, and which has a triangular cross section. In this case, a height of the lever part 10 may be the same as a height of a quadrangular recess 21 of the console part 20, which is to be described below, so that the lever part 10 is mounted within the quadrangular recess 21 of the console part 20 to be prevented from protruding to the outside, and may not be greater than a width of the lever part 10 so that coupling of the lever part 10 and the console part 20 may be maintained during a sliding operation of the lever part 10.

The lever part 10 may further be provided with a gripping groove, to which a finger of a user is inserted to enable the user to easily slide the lever part 10.

In the meantime, as illustrated in FIG. 4, the lever part 10 may further include a magnetic lever pin part 11 on a lower surface thereof. The magnetic lever pin part 11 is formed by attaching a magnet to a distal end of a magnetic fixing part which downwardly protrudes from the lever part 10, and may be positioned at a center part of the lower surface of the lever part 10. The magnetic lever pin part 11 is provided to recognize a position of magnetic force of the magnet by using a magnetic sensor 40 according to a position movement by an operation of the lever part 10 to recognize the operation of the lever part 10.

The console part 20 is disposed on the console inside the vehicle, and is preferably disposed at a position at which the electronic shift lever is disposed. Accordingly, the console part 20 is disposed at a similar position to that according to a driver's driving habit using the electronic shift lever in the related art, thereby preventing confusion of the driver.

The console part 20 serves to fix the lever part 10 so that the lever part 10 slidably moves on the console part 20. To this end, the console part 20 includes a quadrangular recess 21 for accommodating the lever part 10 on the console part 20, and further includes a slot portion 22 formed in a diamond shaped recess through which the magnetic lever pin part 11 of the lever part 10 is inserted into the quadrangular recess 21 to guide the path of the lever part 10.

In an exemplary embodiment of the present invention, the slot portion 22 may include at least four sides and the at least four sides thereof are curved inwards.

Each vertex of the quadrangular recess 21 and each vertex of the slot portion 22 are offset in an angular direction with respect a central axis of the slot portion 22.

The quadrangular recess 21 is configured so that the lever part 10 is inserted into the quadrangular recess 21 to slidably move within the quadrangular recess 21, and to this end, the shape of the quadrangular recess 21 may have a quadrangular shape having curved borders.

The present invention is configured so that the gear shift stages of the vehicle are allocated to the respective borders (the four borders) of the quadrangular recess 21, and the close contact of the lever part 10 to any one (one side) among the borders of the quadrangular recess 21 is recognized as the operation of the gear shift stage. To this end, a length of one side surface of the border of the quadrangular part 21 may be the same as a length of one side of the lever part 10.

In the meantime, as described above, a height of the quadrangular recess 211 may be the same as that of the lever part 10, and a height of the slot portion 22 is the same as or larger than a height of the magnetic lever pin part 11 protruding downwardly from the lever part 10.

As illustrated in the drawings, the slot portion 22 has the diamond shape so as to correspond to a movement path of the magnetic lever pin part 11 by the lever part 10, which slidably moves within the quadrangular recess 21, and more preferably, the slot portion 22 is formed in the diamond shape, and each of the four sides of the diamond shape is formed by a straight recess formed in a lower direction of the console part 20, and the four straight recesses are joined in the diamond shape to form the slot portion 22.

Figure 7A:
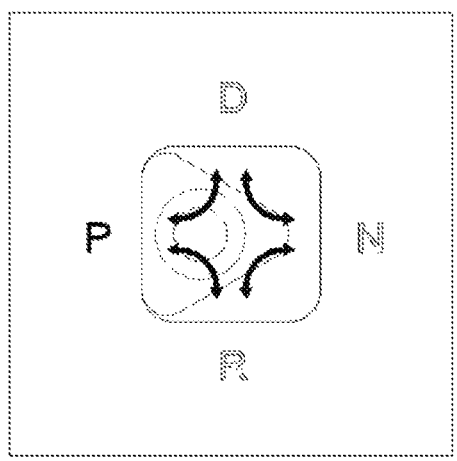
FIG. 7A is a diagram illustrating a path along which the lever part moves within a quadrangular recess in the exemplary sliding operation type electronic auto shift lever according to the present invention.
Figure 7B:
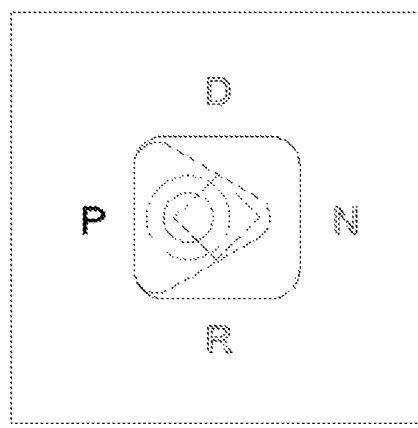
FIG. 7B is a diagram illustrating a movement path along which a magnetic lever pin part moves according to the movement of the lever part within the quadrangular recess in the exemplary sliding operation type electronic auto shift lever according to the present invention.

FIGS. 7A and 7B illustrate a path along which the lever part 10 moves within the quadrangular recess 21 (FIG. 7A), and a movement path along which the magnetic lever pin part 11 moves according to the movement of the lever part 10 within the quadrangular recess 21 (FIG. 7B).

As illustrated in the drawings, the lever part 10 positioned within the quadrangular recess 21 is formed so as to move in a diagonal direction when sliding to an adjacent predetermined side from one side of the quadrangular recess 21. Accordingly, the slot portion 22 is formed in the diamond shape deviated by 45° from the quadrangular recess 21 according to the movement path of the lever part 10.

In the meantime, in various embodiments of the present invention, in the operation of the lever part 10, the present invention further includes position fixing parts 30 in order to allow the driver to recognize whether the auto shift lever reaches a desired gear shift stage during the operation of each gear shift.

Figure 8:
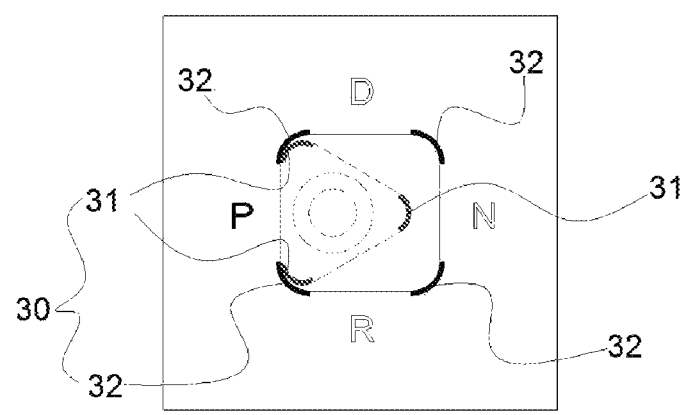
FIG. 8 is a top plan view illustrating the lever part and the console part provided with a position fixing part in the exemplary sliding operation type electronic auto shift lever according to the present invention.

FIG. 8 is a top plan view illustrating the lever part 10 and the console part 20 provided with the position fixing parts 30.

As illustrated in FIG. 8, the position fixing parts 30 include one or more first position fixing parts 31 and one or more second position fixing parts 32, and the one or more first position fixing parts 31 and the one or more second position fixing parts 32 may be pulled to each other to be fixed when one or more first position fixing parts 31 and the one or more second position fixing parts 32 are adjacent to each other within a predetermined position by magnetic force thereof.

In various embodiments of the present invention, the first position fixing part 31 is provided at each corner of the quadrangular recess 21 of the console part 20, and the second position fixing part 32 is provided at each corner of the lever part 10. Further, the first position fixing part 31 and the second position fixing part 32 include a magnet having opposite poles, and thus, when the first position fixing part 31 and the second position fixing part 32 are adjacent to each other within the predetermined position, the first position fixing part 31 and the second position fixing part 32 may be attached by magnetic force.

Figure 9A:
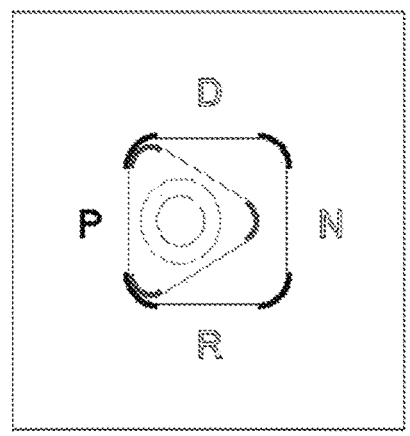
FIG. 9A, FIG. 9B, and FIG. 9C are diagrams illustrating the lever part moving within the quadrangular recess by the position fixing part in the exemplary sliding operation type electronic auto shift lever according to the present invention.
Figure 9B:
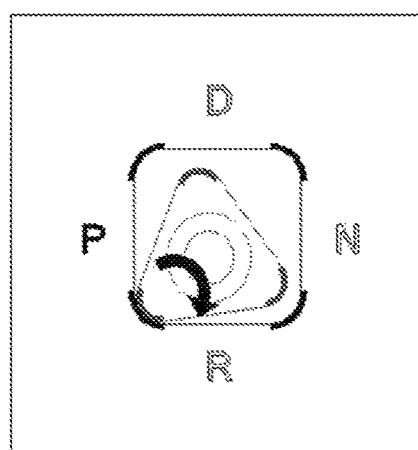
Figure 9C:
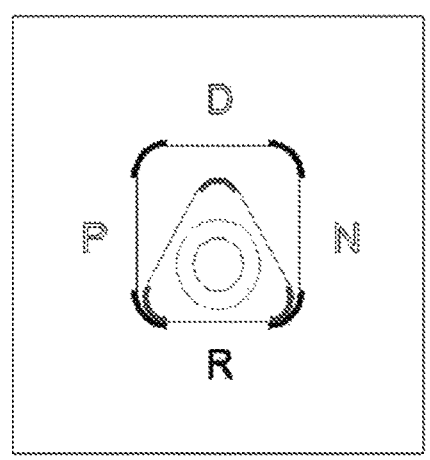

FIGS. 9A-9C illustrate various embodiments in which the lever part 10 moves within the quadrangular recess 21 by the position fixing parts 30, and when the driver moves the lever part 10 in the lower direction from an initial position of FIG. 9A, the lever part 30 rotates and moves based on the position fixing part 30, which receives less power among the position fixing parts 30, as an axis (FIG. 9B), and as a result, the lever part 10 downwardly moves to be fixed by the position fixing parts 30 (FIG. 9C).

That is, when the lever part 10 downwardly moves, attraction is generated between the first position fixing part 31 and the second position fixing part 32 by magnetic force. Accordingly, the lever part 10 is configured to rotate and move based on a contact point of the first position fixing part 31 of the lever part 10 and the second position fixing part 32 within the quadrangular recess 21, which are attached to each other by the magnetic force, as an axis.

Accordingly, the lever part 10 is configured to rotate based on a corner of the quadrangular recess 21 between a current gear shift stage and a gear shift stage, to which the driver desires to change, as an axis, and the aforementioned configuration may advantageously give the driver with an interest, and make the driver easily recognize the gear shift stage.

However, the present invention is not limited thereto, and in various embodiments of the present invention, the first position fixing part 31 may include a magnet and the second position fixing part 32 may include a ferromagnetic material corresponding to the magnet, such as iron and steel. On the contrary, in various embodiments of the present invention, the first position fixing part 31 may include a ferromagnetic material, such as iron and steel, and the second position fixing part 32 may include a magnet.

The gear shift stage recognition unit is provided so as to detect a position of the magnetic lever pin part 11, which moves by a sliding movement of the lever part 10, to recognize an input of a gear shift stage by the operation of the lever part 10 through the detected position of the magnetic lever pin part 11, and may be positioned inside the console part 20 in a lower portion of the lever part 10.

That is, the gear shift stage recognition unit is configured to recognize the position of the magnetic lever pin part 11 through magnetic force of a sub magnetic means included in the magnetic lever pin part 11, and to this end, the gear shift stage recognition unit includes one or more magnetic sensors.

The gear shift stage recognition unit may include one or more magnetic sensors in order to detect a movement position of the lever part 10 within a radius, in which the magnetic lever pin part 11 moves or rotates by the sliding driving of the lever part 10, and the position of the magnetic lever pin part 11 recognized by the gear shift stage recognition unit is input into a gear shift stage controller, which is to be described below, so that a gear shift stage corresponding to a recognized area, in which the magnetic lever pin part 11 is positioned, may be input.

In various embodiments of the present invention, the sliding operation type electronic auto shift lever configured as described above may be connected to the gear shift stage controller to input the detected position of the magnet lever pin part 11 by the movement of the lever part 10 into the gear shift stage controller, and the gear shift stage controller presets a gear shift stage recognition area so as to correspond to the position of the magnetic lever pin part 11, and recognizes that the magnetic lever pin part 11 is positioned in the recognition area, thereby recognizing the gear shift stage. Further, the gear shift stage controller is configured to control the automatic transmission of the vehicle so as to correspond to the gear shift stage recognized as described above.

The gear shift stage controller may be configured to be mounted inside the console of the vehicle, in which the sliding operation type electronic auto shift lever is installed, but the present invention is not limited thereto. The gear shift stage controller may include an electronic control unit (ECU), which is a publicly known matter, so that a detailed description thereof will be omitted.

Gear shift stage information including the P-stage, the R-stage, the N-stage, and the D-stage, which are the gear shift stages of the vehicle, and the gear shift stage recognition area corresponding to the position of the magnetic lever pin part 11 are preset in the gear shift stage controller, and the operation of the gear shift stage is performed according to the preset information based on a signal input from the gear shift stage recognition unit.

As a result, the gear shift stage controller generates gear shift information matched to the input information received from the gear shift stage recognition unit and transmits the generated gear shift information to the controller of the electronic auto transmission of the vehicle, so that the gear shift is finally performed.

In the meantime, in various embodiments of the present invention, the gear shift stage recognition area stored by the gear shift stage controller may be set so that the respective gear shift stages, that is, the P-stage, the R-stage, the N-stage, and the D-stage, are matched to the respective corners of the slot portion 22 of the console part 20, and as illustrated in FIGS. 9A-9C, the D-stage may be set at a front side of the driver, the R-stage may be set at a rear side of the driver, the P-stage may be set at a side of the driver, and the N-stage may be set at an opposite side of the driver.

In the case where the gear shift stages are set as described above, when the driver desires to move forward in the set P-stage of the gear shift stage at the initial driving of the vehicle, an operation of moving the lever part 10 in an upper diagonal direction is induced, and when the driver desires to move backwardly, an operation of moving the lever part 10 in a lower diagonal direction is induced, so that a traveling direction of the vehicle corresponds to the operation direction of the lever part 10, thereby preventing an erroneous operation of the lever part 10, and providing convenience during the driving.

Figure 10:
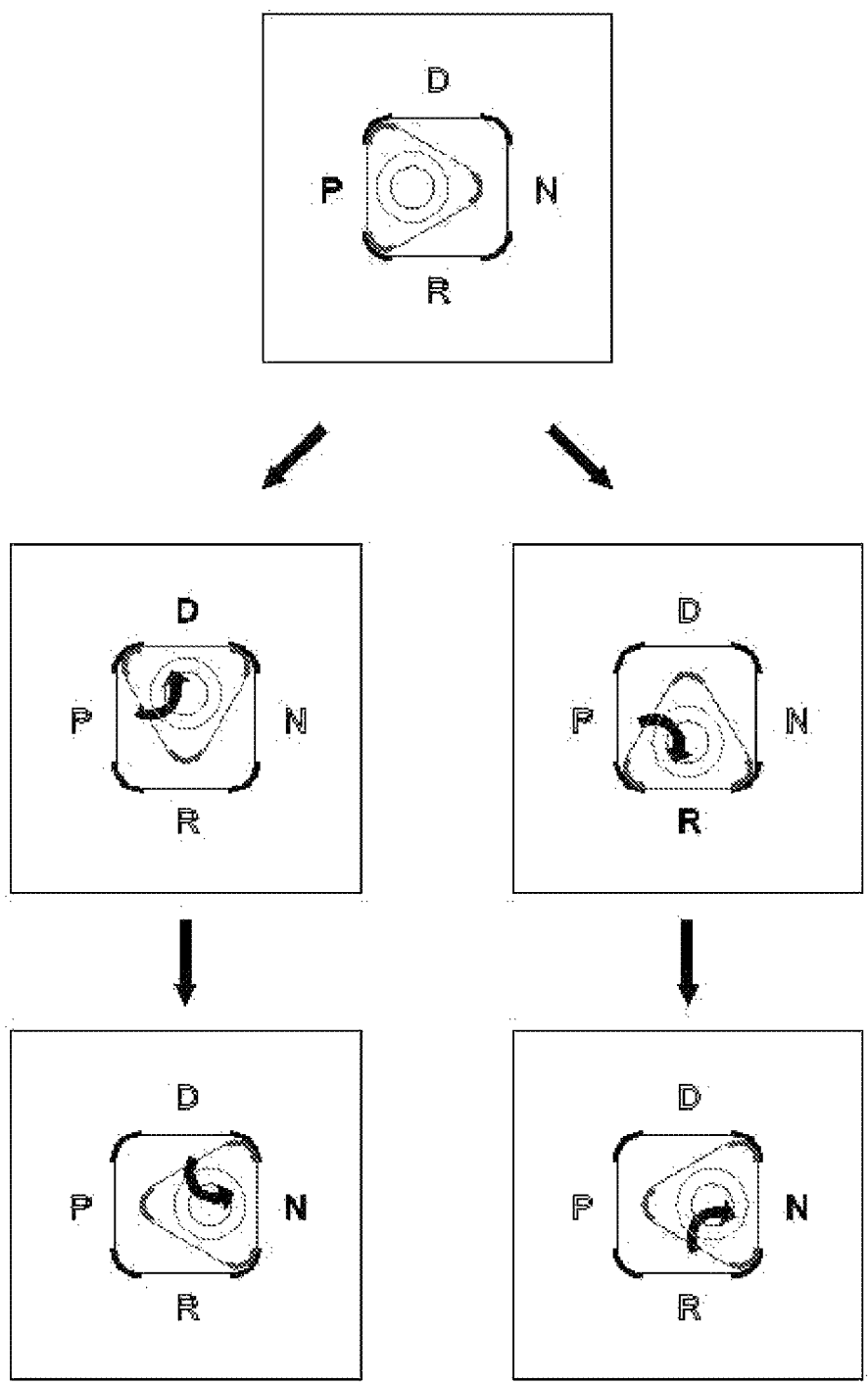
FIG. 10 is a diagram illustrating an operation of performing a gear shift to each gear shift stage through the exemplary sliding operation type electronic auto shift lever according to the present invention.

FIG. 10 illustrates an operation of performing a gear shift to each gear shift stage through the sliding operation type electronic auto shift lever according to the present invention, which is configured as described above.

As illustrated in FIG. 10, in the case where the driver needs to shift the set P-stage to the D-stage for driving at the time of the first starting, the driver slides and moves the lever part 10 in the front direction, and on the contrary, in the case where the driver needs to shift the gear to the R-stage for the backward driving, the driver slides and moves the lever part 10 in the rear direction, thereby shifting the gear.

In the case where the driver needs to shift the D-stage or the R-stage to the N-stage, the driver slides and moves the lever part 10 to a right side of the vehicle, to which the N-stage is allocated, thereby shifting the gear to the N-stage.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding operation type electronic auto shift lever, comprising:
   a console part disposed on a console of a vehicle, provided with a quadrangular recess, and provided with a slot portion dented inside the quadrangular recess;
   a lever part slidably coupled to an upper portion of the quadrangular recess; and
   position fixing parts including one or more first position fixing parts and one or more second position fixing parts
   wherein the lever part includes a magnetic lever pin part, which protrudes downwardly and includes a magnet, on a lower surface of the lever part, and the magnetic lever pin part is inserted into the slot portion,
   wherein the one or more first position fixing parts are mounted in corners of the quadrangular recess,
   wherein the one or more second position fixing parts are mounted in corners of the lever part, and
   wherein either of the first position fixing part or the second position fixing part includes a magnet, and either of the first position fixing part or the second position fixing part includes a ferromagnetic material.

2. The sliding operation type electronic auto shift lever of claim 1, wherein the slot portion includes at least four sides and the at least four sides are curved.

3. The sliding operation type electronic auto shift lever of claim 1, wherein each vertex of the quadrangular recess and each vertex of the slot portion are offset in an angular direction with respect a central axis of the slot portion.

4. The sliding operation type electronic auto shift lever of claim 1, wherein corners of the quadrangular recess and corners of the lever part are formed of curved surfaces.

5. The sliding operation type electronic auto shift lever of claim 1, further comprising:
   position fixing parts including one or more first position fixing parts and one or more second position fixing parts,
   wherein the one or more first position fixing parts are mounted in corners of the quadrangular recess,
   wherein the one or more second position fixing parts are mounted in corners of the lever part, and
   wherein the first position fixing part and the second position fixing part include magnets having different magnetic polarities, respectively.

6. The sliding operation type electronic auto shift lever of claim 1, further comprising:
   a gear shift stage recognition unit disposed under the magnetic lever pin part, and including one or more magnetic sensors,
   wherein the gear shift stage recognition unit detects magnetic force of the magnetic lever pin part to recognize a position of the magnetic lever pin part.

7. The sliding operation type electronic auto shift lever of claim 6,
   wherein the gear shift stage recognition unit is connected with a gear shift stage controller of the vehicle to transmit recognized position information about the magnetic lever pin part, and
   wherein the gear shift stage controller receives the position information about the magnetic lever pin part from the gear shift stage recognition unit, and controls gear shift of an electronic auto transmission of the vehicle to be a predetermined gear shift stage in response to the position of the magnetic lever pin part.

8. The sliding operation type electronic auto shift lever of claim 7, wherein the gear shift stage controller presets gear shift stage information including a P-stage, an R-stage, an N-stage, and a D-stage, which are gear shift stages of the vehicle, and a gear shift stage recognition area corresponding to the position of the magnetic lever pin part, and generates gear shift information, which is matched with the position information of the magnetic lever pin part received from the gear shift stage recognition unit, to perform gear shift of the electronic auto transmission of the vehicle.

9. The sliding operation type electronic auto shift lever of claim 1, wherein the lever part is formed in a triangular shape, and the lever part rotates and moves based on a contact point of a predetermined corner of the lever part and a predetermined corner inside the quadrangular recess as an axis when moving within the quadrangular recess.

* * * * *